United States Patent [19]
Nii

[11] Patent Number: 5,550,445
[45] Date of Patent: Aug. 27, 1996

[54] GENERATOR CONTROLLER AND CONTROLLING METHOD FOR HYBRID VEHICLE

[75] Inventor: Yoshihide Nii, Fuji, Japan

[73] Assignee: Toyota Jidosha Kabushiki Kaisha, Aichi, Japan

[21] Appl. No.: 302,412

[22] Filed: Sep. 8, 1994

[30] Foreign Application Priority Data

Sep. 24, 1993 [JP] Japan ................................. 5-237547

[51] Int. Cl.$^6$ ................................. H02D 5/20; B60K 1/00
[52] U.S. Cl. ..................... 318/153; 318/140; 361/52; 322/16; 180/65.3
[58] Field of Search ........................ 318/153, 138, 318/140, 151, 152, 154; 322/23, 8, 38, 39, 15, 16; 301/18, 31, 23, 52, 54; 180/65.2, 65.4, 65.1, 65.3

[56] References Cited

U.S. PATENT DOCUMENTS

| | | | |
|---|---|---|---|
| 4,199,037 | 4/1980 | White | 180/65 C |
| 4,327,295 | 4/1982 | Deane | 318/139 |
| 4,413,698 | 11/1983 | Conrad et al. | 180/305 |
| 4,459,489 | 7/1984 | Kirk et al. | 361/18 |
| 5,081,365 | 1/1992 | Field et al. | |
| 5,212,431 | 5/1993 | Origuchi et al. | 318/139 |
| 5,264,764 | 11/1993 | Kuang | 318/139 |
| 5,280,232 | 1/1994 | Kohl et al. | 322/23 |
| 5,301,764 | 4/1994 | Gardner | 180/65.2 |

FOREIGN PATENT DOCUMENTS

| | | |
|---|---|---|
| 543390 | 5/1993 | European Pat. Off. |
| 4109379 | 10/1991 | Germany. |
| 4113386 | 10/1992 | Germany. |
| 4133013 | 4/1993 | Germany. |
| 57-202842 | 12/1982 | Japan. |

*Primary Examiner*—John W. Cabeca
*Attorney, Agent, or Firm*—Oliff & Berridge

[57] ABSTRACT

A generator controller and controlling method of a hybrid vehicle. A battery voltage is compared with a predetermined value and when the battery voltage is lower than the predetermined value as a result of the comparison, an state of charge of the battery is discriminated. In the case of an state of charge of at least 70%, a generator output is controlled on the basis of a motor output, and in the case of an state of charge of less than 70%, while the generator output is controlled to a relatively high value, the motor output is limited. When the state of charge is restored to more than 75%, the voltage is controlled depending on the motor output. In the case of at least the predetermined value of the battery voltage, an idle control of an engine is carried out. As a result, the state of charge of the battery can be ensured and overcharging of the battery can be prevented.

16 Claims, 12 Drawing Sheets c: MAX MOTOR OUTPUT $P_{Mmax}$
WHEN NOT LIMITING OUTPUT

GENERATOR CONTROLLER AND CONTROLLING METHOD FOR HYBRID VEHICLE

BACKGROUND OF THE INVENTION i) Field of the Invention

The present invention relates to a controller of a generator mounted on a hybrid vehicle and a control method for this generator.

ii) Description of the Related Arts

As an electric vehicle, a so-called hybrid vehicle is well-known. In the vehicle of this kind, an engine is provided in addition to a motor as a driving source of the vehicle. For example, in a series hybrid vehicle, while an output of a battery such as a lead battery or the like mounted on the vehicle is supplied to the motor as driving power, an output of a generator driven by the engine is also supplied to this motor as the driving power. In this case, the generator and the battery connected in parallel are coupled with the motor and thus the battery can be charged using the output of the generator. That is, even when the battery is discharged during running of the vehicle, it is not necessary to charge this battery using an external power source. In other words, by driving the engine, the battery can be charged using the output of the generator. Moreover, the driving power of the motor can be supplied from not only the battery but also the generator, and the battery can be miniaturized.

In the case of using the battery such as the lead battery or the like mounted on the hybrid vehicle, by maintaining the state of charge (SOC) of the battery at approximately 70 to 80%, the life of the battery can be sugnificantly extended. Hence, it is preferable to control the SOC of the battery. As the controlling means for the SOC of the battery, for instance, a field current of a generator, that is, a generator output, is controlled to turn on or off, as disclosed in Japanese Patent Laid-Open No. Sho 57-202842.

However, in such a battery SOC control by controlling the generator output using the on/off control of the field current, it is difficult to accurately control the SOC of the battery in a predetermined range and to prevent overcharging. That is, simple on/off control of the field current often causes the SOC to go out of a target range and also causes overcharging of the battery in certain cases.

Further, when the motor is under heavy load, the generator output and the power of the battery are used for driving the motor. When this situation lasts for a long period of time, the battery is discharged and its SOC is significantly reduced. This SOC reduction brings about a short battery life.

SUMMARY OF THE INVENTION

Accordingly, it is a first object of the present invention to ensure an elongated battery life.

It is a second object of the present invention to effectively prevent overcharging of the battery.

It is a third object of the present invention to improve emission and fuel consumption of an engine.

It is a fourth object of the present invention to realize a driving feeling similar to a gasoline engine vehicle.

It is a fifth object of the present invention to attain these objects by controlling an SOC of the battery to be in a predetermined target range even in a continuous heavy load state.

In accordance with one aspect of the present invention, there is provided a generator controller for controlling an operation of a generator, mounted on a hybrid vehicle including a motor for driving the vehicle; a battery for supplying electric power to the motor; the generator supplying electric power to the motor and the battery; and an engine for driving the generator, the generator controller comprising:

a) means for detecting a heavy load state in which a battery charge state is reduced to less than a predetermined value;

b) means for carrying out an increase control of an output of the generator and an output limitation of the motor so that, when the heavy load state is detected, there is a period during which the generator output is used for charging the battery occurs; and c) means for either stopping or avoiding the increase control of the generator output and the output limitation of the motor at least when the heavy load state is not detected.

In accordance with another aspect of the present invention, there is provided a generator controlling method for controlling an operation of a generator, executed on a hybrid vehicle including a battery for supplying electric power to a motor; the generator for supplying electric power to the motor and the battery; and an engine for driving the generator, the generator controlling method comprising:

a) a step for detecting a heavy load state in which a battery charge state is reduced to less than a predetermined value;

b) a step for carrying out an increase control of an output of the generator and an output limitation of the motor so that, when the heavy load state is detected, there is a period during which the generator output is used for charging the battery; and c) a step for either stopping or avoiding the increase control of the generator output and the output limitation of the motor at least when the heavy load state is not detected.

In the present invention, first, the heavy load state is detected. When the heavy load state is detected, the increase control of the output of the generator and the output limitation of the motor output are carried out. As a result of this control, there is a period during which the output of the generator is used for the charging of the battery. As a result of this charging, the charge state of the battery is recovered and when the heavy load state is released, the increase control of the generator output and the output limitation of the motor are stopped. Hence, according to the present invention, the SOC of the battery can suitably be ensured and overcharging of the battery can be prevented.

In the present invention, further, the procedure including step for detecting at least a predetermined degree of charging of the battery as a voltage increased state of at least a predetermined voltage of the battery; a step for carrying out an idle control of the engine and a generation stop control of the generator when the voltage increased state is detected; and a step for either stopping or avoiding the idle control of the engine and the generation stop control of the generator at least when the voltage increased state is not detected, can be executed. At the stage where the idle control of the engine and the generation stop control of the generator are carried out, only the discharge output of the battery is consumed by the motor. As a result of this discharging, after coming from at least the voltage increased state, the idle control of the engine and the generation stop control of the generator are stopped. Hence, in this construction, overcharging of the battery can definitely be prevented.

In the present invention, moreover, the procedure including a step for gradually decreasing the output of the generator to a predetermined value when the idle control of the engine and the generation stop control of the generator are executed; and a step for gradually increasing the output of the generator to an equivalent value required for the motor output, can be executed. According to this procedure, the degradation of the fuel consumption and emission, upon moving to or stopping the idle control of the engine and the generation stop control of the generator, can be prevented.

In the present invention, also, the procedure including a step for detecting the output of the motor; and a step for flattening the motor output detected, and controlling the output of the generator on the basis of a value obtained by adding a limitation corresponding to a generation output range of the generator to the flattened motor output, can be performed. According to this procedure, the generator output corresponding to the motor output can be obtained, and hence it becomes difficult to continue discharge of the battery, and its SOC degradation can be prevented. Also, since a flattening of output is carried out, the degradation of the emission and the fuel consumption can be prevented. In addition, in order to obtain the engine output corresponding to the motor output, the control can be executed, and this leads to a realization of a driving feeling similar to that of an engine vehicle due to the engine sound and the like. Further, the motor output is flattened and the control is executed in order to obtain the engine output corresponding to the flattened motor output, thereby carrying out generation depending on an average output of the motor during driving. Hence, a sharp change of the motor output does not appear in the generator output and the generation can be performed with better fuel consumption when the engine is used to for the generator.

The present invention further includes a step for either stopping or avoiding the idle control of the engine and the generation stop control of the generator only when the voltage increase state continues for a predetermined period of time. In this case, the execution of the idle control of the engine and the generation stop control of the generator regardless of a temporary voltage increase, can be prevented.

In the present invention, also, the idle control of the engine and the generation stop control of the generator are maintained for at least a predetermined time. In this case, the frequency of moving between the idle state and the driving state can be restricted, and hence the degradation of the fuel consumption and the emission with this transition can be prevented.

In the present invention, the flattening is executed by integrating. This integration can be executed in a software or hardware manner. Also, prior to the flattening, by multiplying the detected motor output by a factor considering efficiency, more precise control can be carried out.

Further, when the charge state of the battery becomes at least a predetermined value owing to the increase control of the generator output and the output limitation of the motor, in place of the control based on the detected motor output, limitation control of the generator output can be carried out or the generator output can be controlled depending on the charge state of the battery.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
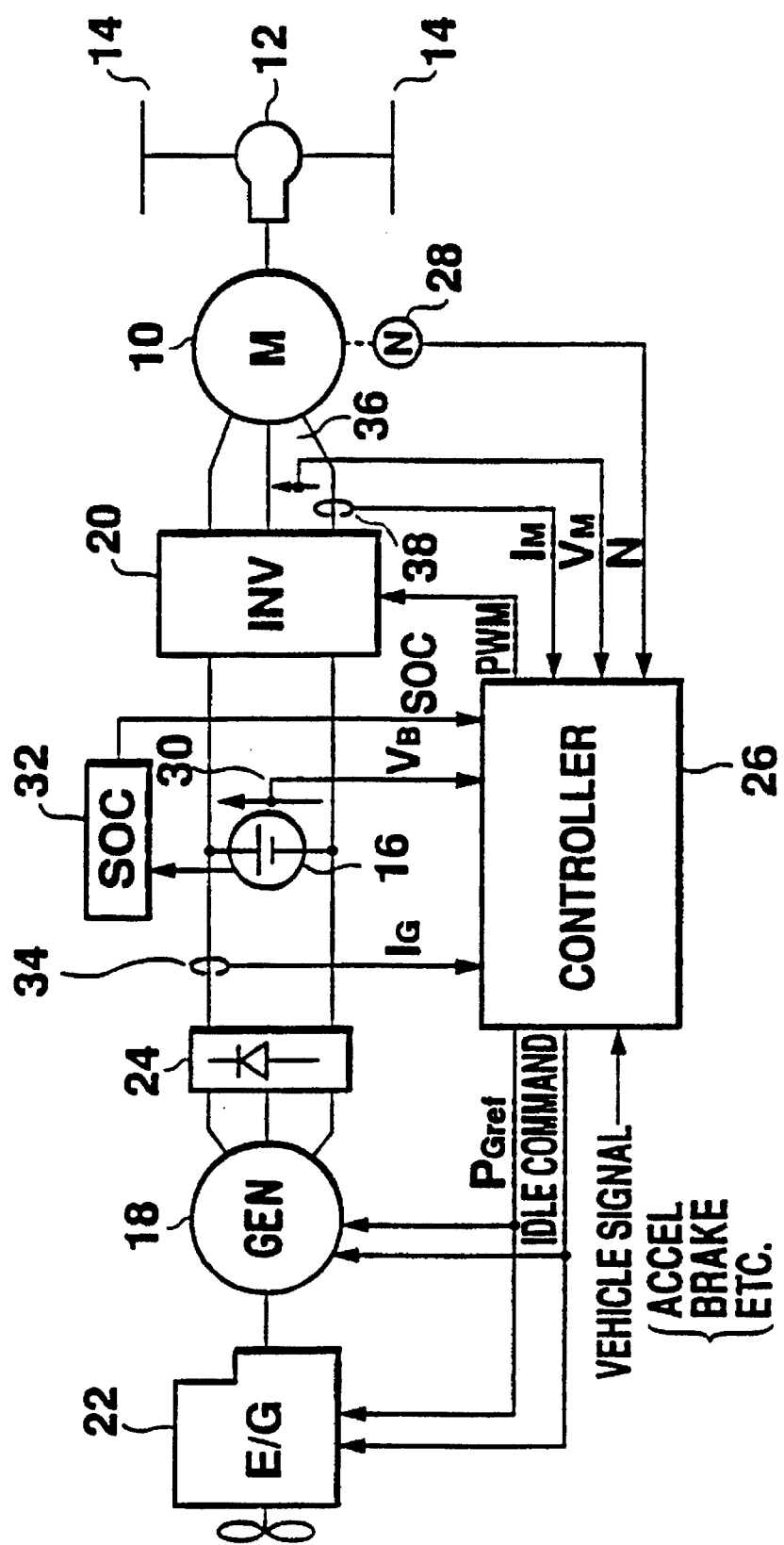
FIG. 1 is a block diagram of a system of a generator controller of a hybrid vehicle according to the present invention.

The present invention will now be described in connection with its preferred embodiments with reference to the accompanying drawings, wherein like reference characters designate like or corresponding parts throughout the views and thus the repeated description thereof can be omitted for brevity.

a) System Construction

In FIG. 1, there is shown a system of a generator controller of a hybrid vehicle according to the present invention.

As shown in FIG. 1, a three-phase AC motor 10 as a driving source is mounted on the hybrid vehicle. An output axis of the motor 10 is coupled with driving wheels 14 via a differential gear unit 12, and thus the vehicle can be driven by driving the motor 10. As a driving source of the motor 10, a battery 16 and a generator 18 are provided. The battery 16 is a lead battery and is connected to the input side of an inverter 20, which converts the output of the battery 16 into three-phase AC electric power. This power is supplied to the motor 10 to be used for driving. The generator 18 is a three-phase AC generator driven by an engine 22. The engine 22 is operated in a predetermined high efficiency area with good emission and fuel consumption. The output of the generator 18 is rectified by a rectifier 24 and the obtained DC current is input to the inverter 20 in the same manner as the output of the battery 16. Hence, the output of the generator 18 is also used as the driving power of the motor 10. The output of the generator 18 is also used for charging the battery 16.

A controller 26 supplies a PWM (pulse width modulation) signal to the inverter 20 in order to control the output of the motor 10. That is, the controller 26 receives a vehicle signal representing the operation of an accelerator, a brake or the like by the driver and calculates a reference torque indicating a torque to be output from the motor 10. In addition, the controller 26 also calculates a reference current for the motor 10 using a rotation speed N of the motor 10, detected by a rotation speed sensor 28 attached to the motor 10. The obtained reference current is converted into a PWM signal for controlling switching elements which constitute the inverter 20. Since this PWM signal is supplied to the inverter 20, the output of the motor 10 is controlled so as to become an output torque shown by the vehicle signal.

Further, the controller 26 controls the operations of the engine 22 and the generator 18 together with the output torque. In other words, the controller 26 controls various driving conditions of the engine 22 and a field current of the generator 18 on the basis of a reference generator output $P_{Gref}$ obtained by a predetermined calculation. When predetermined conditions are satisfied, the controller 26 also gives an idle command to the engine 22 and the generator 18, thereby not only controlling the engine 22 to an idle state but stopping the operation of the generator 18.

Moreover, in FIG. 1, the battery 16 is provided with a voltage sensor 30 and an SOC sensor 32. These sensors 30 and 32 detect a voltage $V_B$ and an SOC of the battery 16, respectively, and feed the detected results to the controller 26. A current sensor 34 is arranged in a current path between the rectifier 24 and the battery 16 and detects a generated current $I_G$, which is sent to the controller 26. Further, a voltage sensor 36 and a current sensor 38 are mounted on a wiring coupling between the inverter 20 and the motor 10 and these sensors 36 and 38 detect a motor voltage $V_M$ and a motor current $I_M$ to be fed to the controller 26.

b) The First Embodiment

Figure 2:
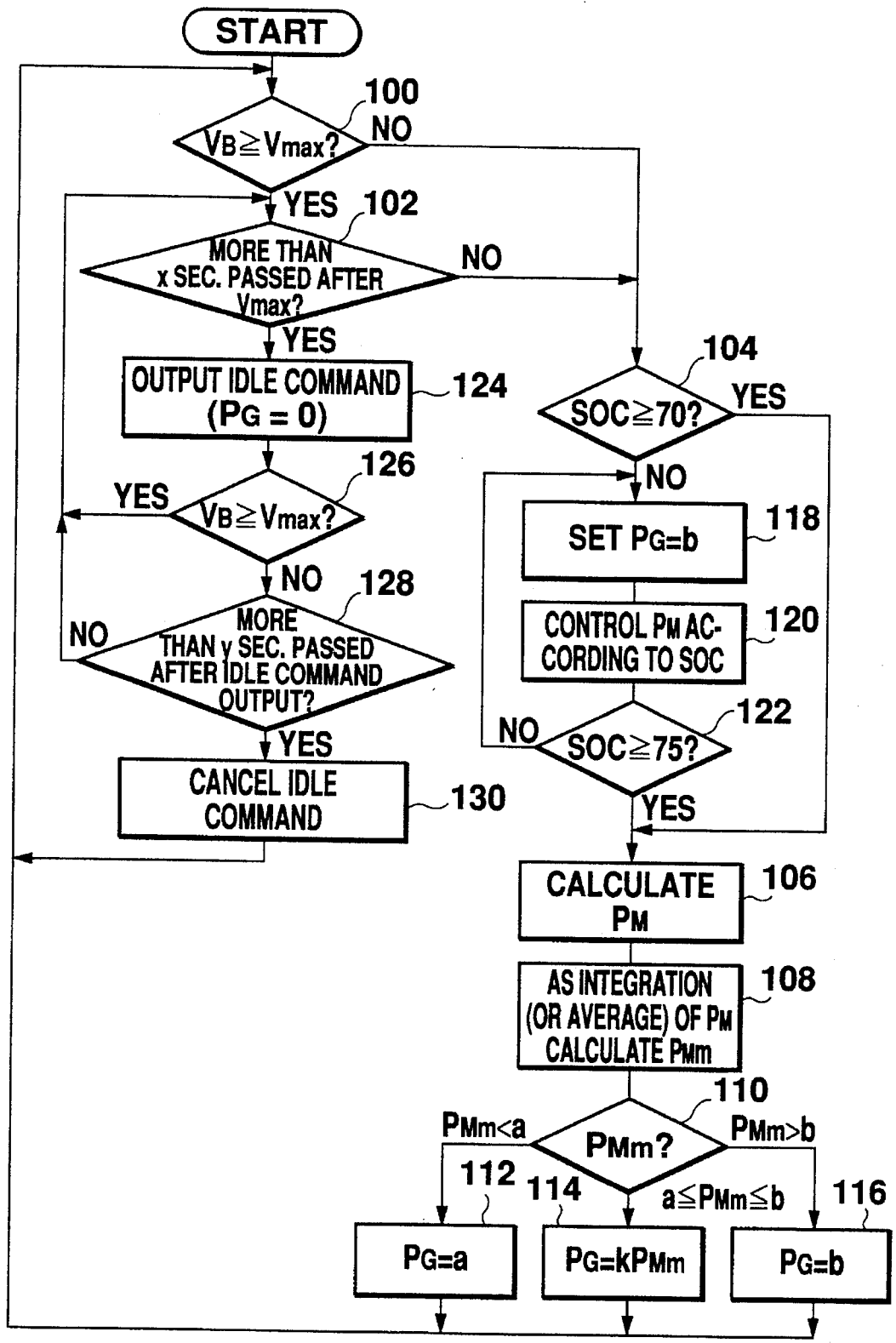
FIG. 2 is a flowchart showing an operation of a first embodiment of a generator controlling method according to the present invention.

In FIG. 2, there is shown a flow of operation of the controller 26 in the first embodiment of a generator controlling method according to the present invention.

In this embodiment, as shown in FIG. 2, the controller 26 detects an increase of the battery voltage $V_B$ in step 100. The voltage $V_B$ of the battery 16 increases depending on a charging current and a SOC in the charging operation. In step 100, the battery voltage $V_B$ detected by the voltage sensor 30 is compared with a predetermined value $V_{max}$. As a result, when $V_B \geq V_{max}$ in step 100, it is considered that the voltage $V_B$ has increased considerably, and steps 102 and subsequent steps will be executed. On the contrary, in step 100, when $V_B < V_{max}$, steps 104 and subsequent steps will be carried out.

First, in step 100, when $V_B < V_{max}$, or the voltage $V_B$ is judged to not have increased so much, the controller 26 discriminates whether $SOC \geq 70\%$ or not in step 104. As a result in step 104, when it is discriminated that $SOC \geq 70\%$, the process moves to step 106.

In step 106, the controller 26 calculates an output $P_M$ of the motor 10. The motor output $P_M$, for example, can be calculated by multiplying the reference torque obtained based on the vehicle signal, by the revolution speed N detected by the rotation speed sensor 28, or it can also be calculated on the basis of the motor voltage $V_M$ and motor current $I_M$ detected by the respective voltage sensor 36 and current sensor 38. The calculated motor output $P_M$ is then integrated (or averaged) to obtain an integration (or average) $P_{Mm}$ of the motor outputs $P_M$ in step 108 and a decision is made depending on the obtained integration $P_{Mm}$ in step 110. In step 110, the integration $P_{Mm}$ is compared with predetermined values a and b (a<b) which represent lower and upper limit power values in a target control range of the generator output of the generator 18. As a result in step 110, when it is discriminated that $P_{Mm}<a$, $a \leq P_{Mm} \leq b$, or $P_{Mm}>b$, the process moves to step 112, 114 or 116, respectively, and a calculation of $P_G=a$, $P_G=kP_{Mm}$, or $P_G=b$ is executed in step 112, 114 where K is a constant, or 116, respectively. The obtained $P_G$ as the reference generator output $P_{Gref}$ is used for controlling the generator 18 (for example, a field control of the generator 18) and the engine 22. Thereafter, the operation returns to step 100.

Then, when the discharge of the battery 16 continues and it is discriminated that SOC<70% in step 104, the controller 26 sets $P_G=b$ for the generator 18 and outputs this $P_G$ as the reference generator output $P_{Gref}$ to the generator 18 in step 118. The controller 26 also controls the motor output $P_M$ depending on the SOC of the battery 16 in step 120. That is, the controller 26 restricts the motor output $P_M$ so that the motor output $P_M$ may not increase beyond a maximum motor output $P_{Mmax}$ indicated by a solid line in FIG. 3. In step 122, when the SOC of the battery 16 increases as a result of such controls of the generated power $P_G$ and the motor output $P_M$ and reaches $SOC \geq 75\%$, the operation moves to step 106. In turn, when SOC<75% in step 122, the steps 118 to 120 are repeated until the SOC reaches 75%.

Next, when it is discriminated that $V_B \geq V_{max}$ in step 100, it is discriminated whether or not more than a predetermined number x seconds have passed after the voltage $V_B$ reaches $V_{max}$ in step 102. In step 102, when it is discriminated that x seconds have not passed, the increase of the voltage $V_B$ can be regarded as only a temporary phenomenon and hence the process moves to step 104. On the other hand, when it is discriminated that x seconds have passed in step 102, the increase of the voltage $V_B$ is regarded as not the temporary phenomenon and the operation moves to step 124.

In step 124, the controller 26 supplies the idle command to the engine 22 and the generator 18, so that the engine 22 enters the idle state, and the generator 18 stops generation. That is, the generator output $P_G$ becomes zero. After executing this control, the controller 26 compares the voltage $V_B$ of the battery 16 with the predetermined value $V_{max}$ again in step 126. As a result in step 126, when it is discriminated that $V_B \geq V_{max}$, i.e., the voltage $V_B$ of the battery 16 is still high, the operation returns to step 102. On the contrary, when it is discriminated that $V_B < V_{max}$ in step 126, i.e., the voltage $V_B$ of the battery 16 decreases, the operation moves to step 128. In step 128, it 1s discriminated whether or not more than a predetermined number y seconds have passed after the idle command is output. In step 128, when it is discriminated that y seconds have not passed, the operation returns to step 102. On the other hand, in step 128, when it is discriminated that y seconds have passed, the operation moves to step 130. In step 130, the idle command is canceled and the operation returns to step 100.

Next, various functions realized by the operation described above will be described.

Figure 3:
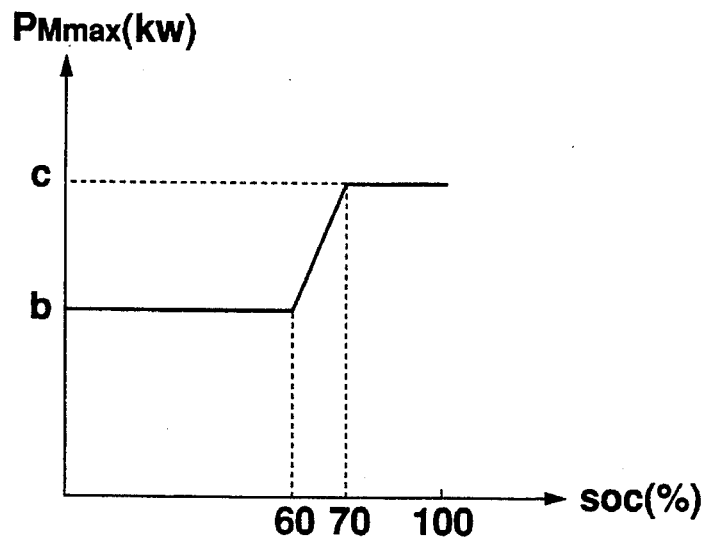
FIG. 3 is a graphical representation showing restriction of a motor output in the first embodiment shown in FIG. 2.

First, the operation in steps 118 to 122, executed depending on the discrimination result in step 104, concerns the SOC control function in this embodiment. That is, when the SOC of the battery 16 drops to less than 70%, the generator output $P_G$ is controlled to the predetermined value b, and the motor output $P_M$ is restricted based on the curve shown in FIG. 3. The predetermined value b in step 118 shows an average consumption power of the motor 10 in a heavy load state which can continuously occur during actual use of the vehicle, for example, an average consumption power when the vehicle is continuously driven at a speed of 100 km/h. In other words, the operation in step 118 corresponds to controlling of the generator output $P_G$ to a relatively large value. The restriction of the motor output $P_M$ in step 120, that is, the operation for reducing the maximum output $P_{Mmax}$ of the motor 10, as shown in FIG. 3, when the SOC is less than 70%, permits not only a reduction in the amount of the generator output $P_G$ which is consumed by the motor 10, but also increases the amount used is change the battery 16. The minimum value of the maximum motor output $P_{Mmax}$ is b. When such a control is executed, a significant part of the generator output $P_G$ is used for the charging of the battery 16 and as a result, the SOC of the battery 16 increases. In this embodiment, at the time point where the SOC of the battery 16 is completely restored in step 122, the compulsory charging in steps 118 and 120 is stopped. At this time, since 75% is used as a threshold value in the discrimination in step 122, hysteresis relating to the control of the SOC of the battery 16 can be realized.

Such an SOC control enables suitable control of the SOC of the battery 16 in the target range, for example, to a range of at least 60%. That is, even if the reduction of the SOC is remarkable, $P_G$ becomes equal to $P_{Mmax}$ at the time point where SOC=60% and thus the SOC cannot decrease any further. Also, this is effective in preventing overcharging of the battery 16. Further, since the generator output $P_G$ is controlled to the fixed value b in step 118, the engine 22 and the generator 18 are in a steady state during the execution of steps 118 and 120 and hence steady, high performance driving of these members can be attained, with associated emission reduction and the fuel consumption improvement.

Figure 4:
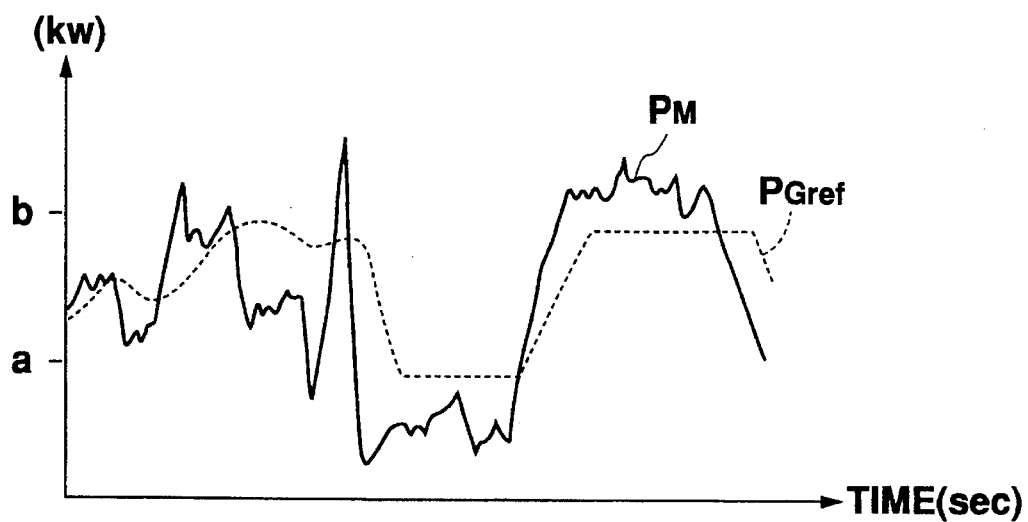
FIG. 4 is a graphical representation showing control of a generator output depending on the motor output in the first embodiment shown in FIG. 2.

Secondly, the operation in steps 106 to 116 corresponds to controlling of the generator output $P_G$ depending on the motor output $P_M$. This means that the generator output $P_G$ is controlled in accordance with the motor output $P_M$ calculated on the basis of the reference torque and the revolution speed N or the motor voltage $V_M$ and the motor current $I_M$. As a result, the power consumption of the motor 10 and the generator output $P_G$, are nearly coincident with each other, preventing the degradation of the SOC of the battery 16. Further, in this embodiment, since the motor output $P_M$ is integrated (or averaged) in step 108, as shown in FIG. 4, after flattening the acute variations, the motor output $P_M$ can be used for the generator control, resulting in the prevention of an emission and fuel consumption drop which are caused by determining the motor output $P_M$ to the reference generator output $P_{Gref}$. Moreover, the generator output $P_G$ is limited by the output range a to b of the generator 18 in steps 110 to 116 to obtain the reference generator output $P_{Gref}$ suitable for this output range. Furthermore, the motor output $P_M$ is multiplied by a factor k resulting from the efficiency of the motor 10 or the inverter 20 in step 114, permitting control considering this efficiency. In this case, it is preferable to determine the integration (average) time constant to approximately 5 seconds in step 108. Further, the value a corresponds to the average consumption power in actual use.

Thirdly, the operation in steps 100, 102 and 124 to 130 corresponds to the idle control of the engine 22 when the battery voltage $V_B$ increases. In particular, in the case of the lead battery used as the battery 16, the increase of the voltage $V_B$ caused during charging, depending on the charging current $I_G$ and the SOC in the rapid regeneration of the motor 10, leads to gassing within the battery 16. Also, in a case of another kind of battery being used, the voltage increase leads to heat generation. These gassing and heat generation phenomena cause the output change of the engine 22 and also have a detrimental bad effect on the life of the battery 16. In this embodiment, when the battery voltage increase continues for at least x seconds, the idle command is output and the gassing and the heat generation can be prevented. As a result, the life of the battery 16 can be properly ensured. Since the mutual rapid transition movement between the output state and the idling state on the occasion of outputting or canceling of the idle command induces degradation of fuel consumption and emission, the transistor operation is preferably carried out gradually.

Figure 5:
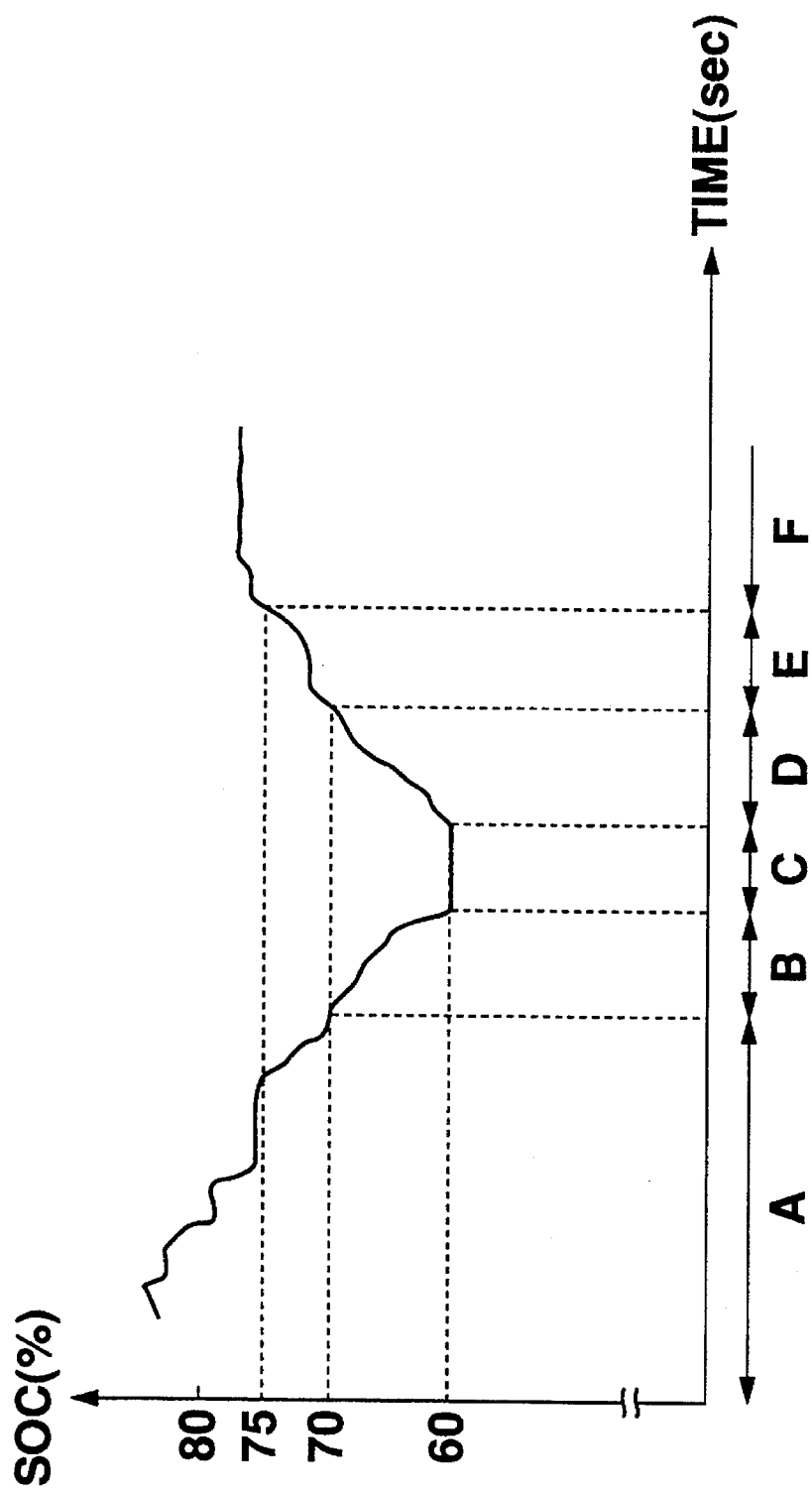
FIG. 5 is a graphical representation showing one example of an SOC change when carrying out an SOC control in the first embodiment shown in FIG. 2.

FIG. 5 illustrates one example of an SOC change of a battery 16 when an SOC control described above, and a generator output $P_G$ control on the basis of a motor output $P_M$, are carried out.

As shown in FIG. 5, it is assumed that the SOC of the battery 16 is first greater than 80% and is gradually reduced to 70% as the battery is discharged (period A). In this period A, since steps 106 to 116 are executed, the generator output $P_G$ is controlled depending on the motor output $P_M$, and concerning the motor output $P_M$, the restriction as in step 120 is not carried out. It is assumed that from this situation, the battery 16 is further discharged so that the SOC is reduced to 60% (period B). In this case, since steps 118 to 122 are executed via step 104, the generator output $P_G$ is controlled to the value b and on the other hand, as shown in FIG. 3, the motor output $P_M$ is controlled within the range indicated by the values b to c depending on the SOC. After the SOC of the battery 16 reaches 60%, as shown in FIG. 3, since the maximum motor output $P_{Mmax}$ is set to the value b, the motor output $P_M$ is not permitted to exceed the value b. On the other hand, since the generator output $P_G$ is controlled to the value b in step 118, the battery 16 stops discharging period C). That is, the SOC of the battery 16 does not degrade below 60%. Thereafter, when the charging of the battery 16 continues due to the difference between the generator output $P_G$ and the motor output $P_M$, and the SOC is restoring, until the SOC of the battery 16 reaches 70% (period D), the maximum motor output $P_{Mmax}$ of the motor output $P_M$ is gradually changed and set from the value b to the value c, and the limit of the motor output $P_M$ is gradually released. When the SOC of the battery 16 reaches 70% (period E), the restriction of the motor output $P_M$ is removed. Then, when the SOC of the battery 16 reaches 75% (period F), the limit of the generator output $P_G$ is also removed. The SOC change described above is shown in Table 1.

Hence, in this embodiment, by a combination of the SOC control and the generator output $P_G$ control depending on the motor output $P_M$, the SOC of the battery 16 can be controlled to be close to 70% or at least 60% at the worst, preventing the degradation of the emission and the fuel consumption. Moreover, by the control of the generator output $P_G$ depending on the motor output $P_M$, a similar engine sound to that of an engine vehicle can be obtained and a similar driving feeling to that of a conventional engine vehicle can also be obtained.

TABLE 1

| Period | generator output $P_G$ (kW) | motor output $P_M$ (kW) |
|---|---|---|
| A | Control depending on $P_M$ | no limit |
| B | b | limit to value of range b to c depending on SOC |
| C | b | b |
| D | b | limit to value of range b to c depending on SOC |
| E | b | no limit |
| F | Control depending on $P_M$ | no limit | c) The Second Embodiment

Figure 6:
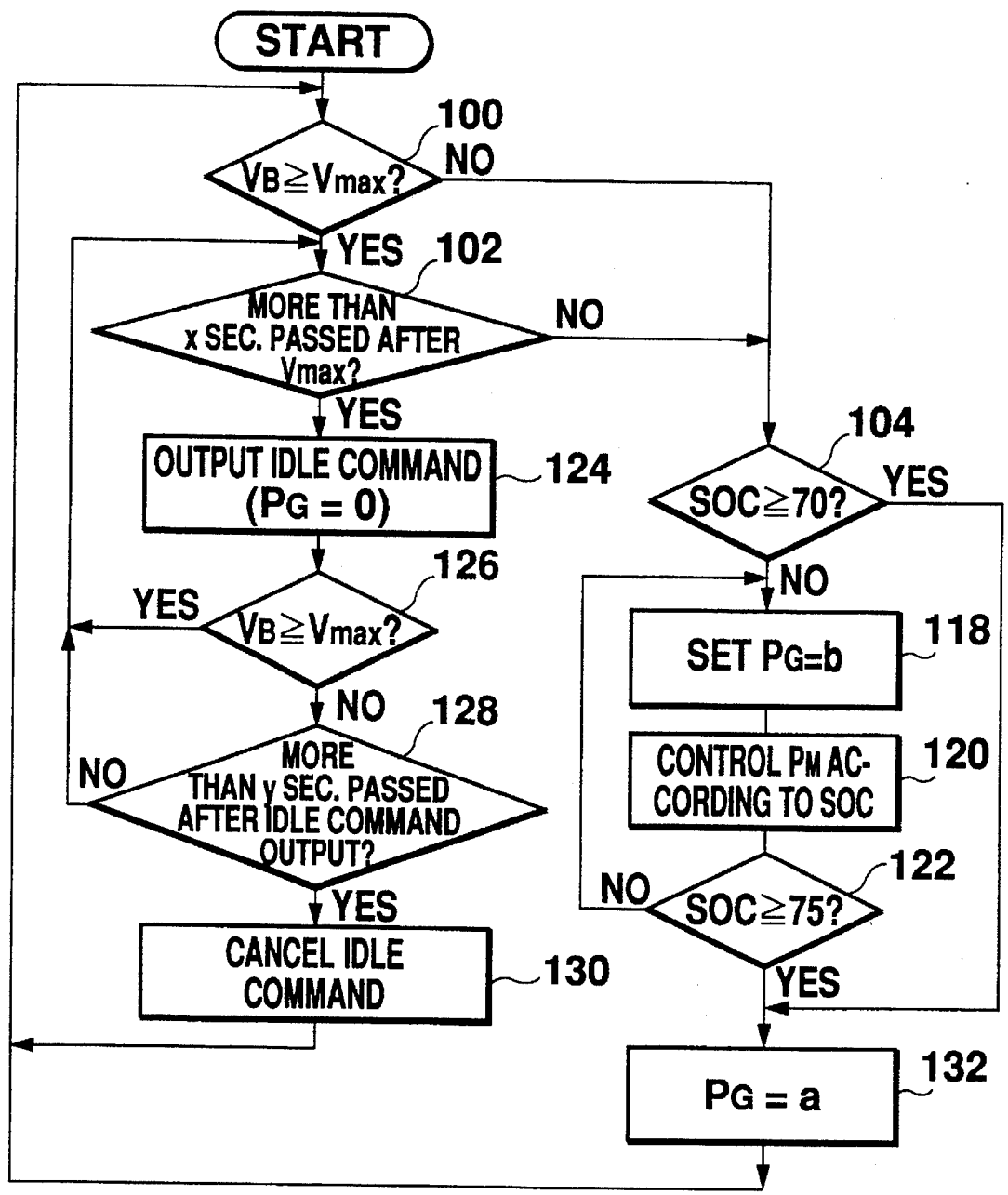
FIG. 6 is a flowchart showing an operation of a second embodiment of a generator controlling method according to the present invention.

In FIG. 6, there is shown a flow of an operation of the controller 26 in the second embodiment of a generator controlling method according to the present invention.

In this embodiment, step 132 is executed in place of steps 106 to 116 in the first embodiment described above. In step 132, the generator output $P_G$ is set to the value a and the reference generator output $P_{Gref}$ becomes a value corresponding to the value a. Hence, in this embodiment, differing from the first embodiment, the control depending on the motor output $P_M$ is not carried out and when considering the situation shown in FIG. 5, a controlling shown in Table 2 is obtained.

Hence, in this embodiment, the control of the generator output $P_G$ becomes control of a two stage steady state driving of the values a and b and the high efficiency driving of the engine 22 and the generator 18, the reduction of the emission and the like can be attained more noticeably.

TABLE 2

| Period | generator output $P_G$ (kW) | motor output $P_M$ (kW) |
|---|---|---|
| A | a | no limit |
| B | b | limit to value of range b to c depending on SOC |
| C | b | b |
| D | b | limit to value of range b to c depending on SOC |
| E | b | no limit |
| F | a | no limit | d) The Third Embodiment

Figure 7:
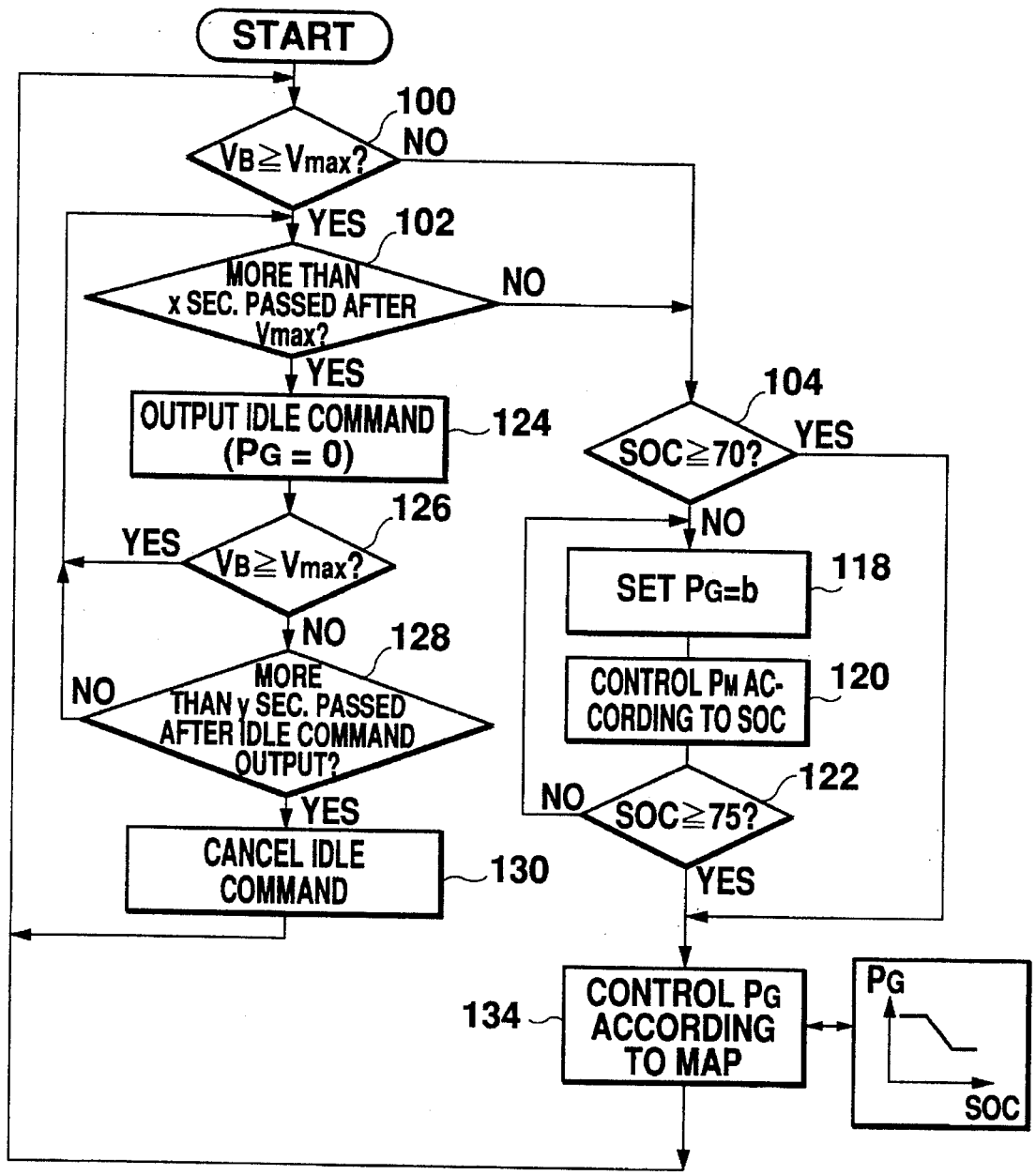
FIG. 7 is a flowchart showing an operation of a third embodiment of a generator controlling method according to the present invention.

In FIG. 7, there is shown a flow of an operation of the controller 26 in the third embodiment of a generator controlling method according to the present invention.

Figure 8:
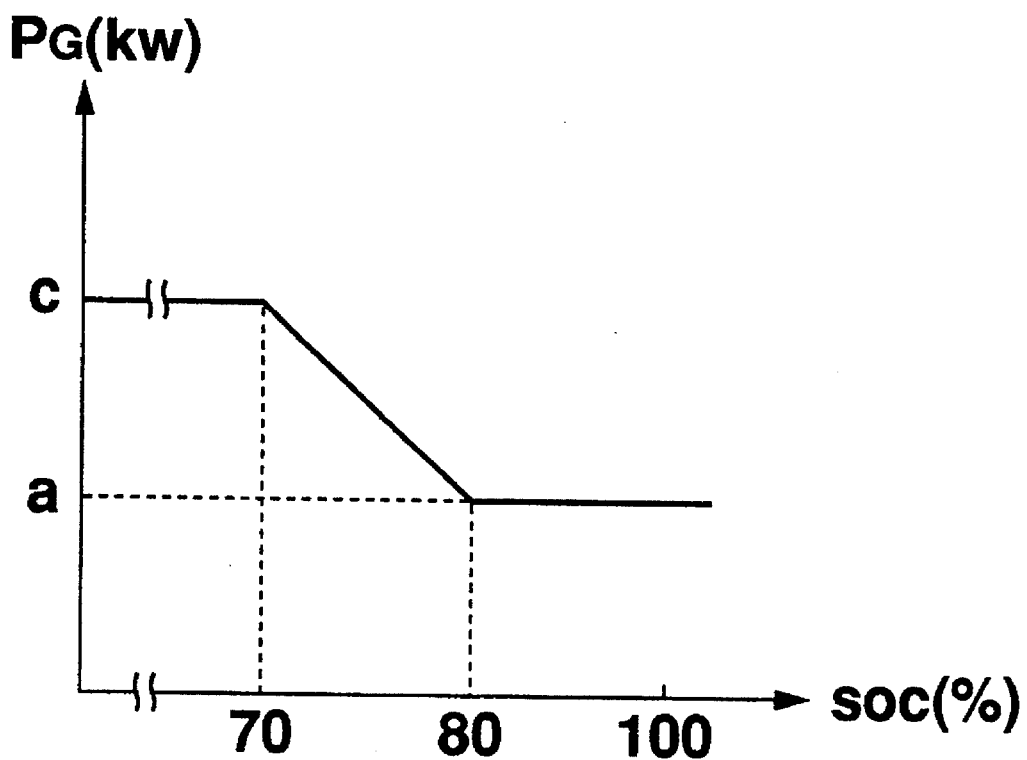
FIG. 8 is a graphical representation showing continuous control of a generator output in the third embodiment shown in FIG. 7.
Figure 9:
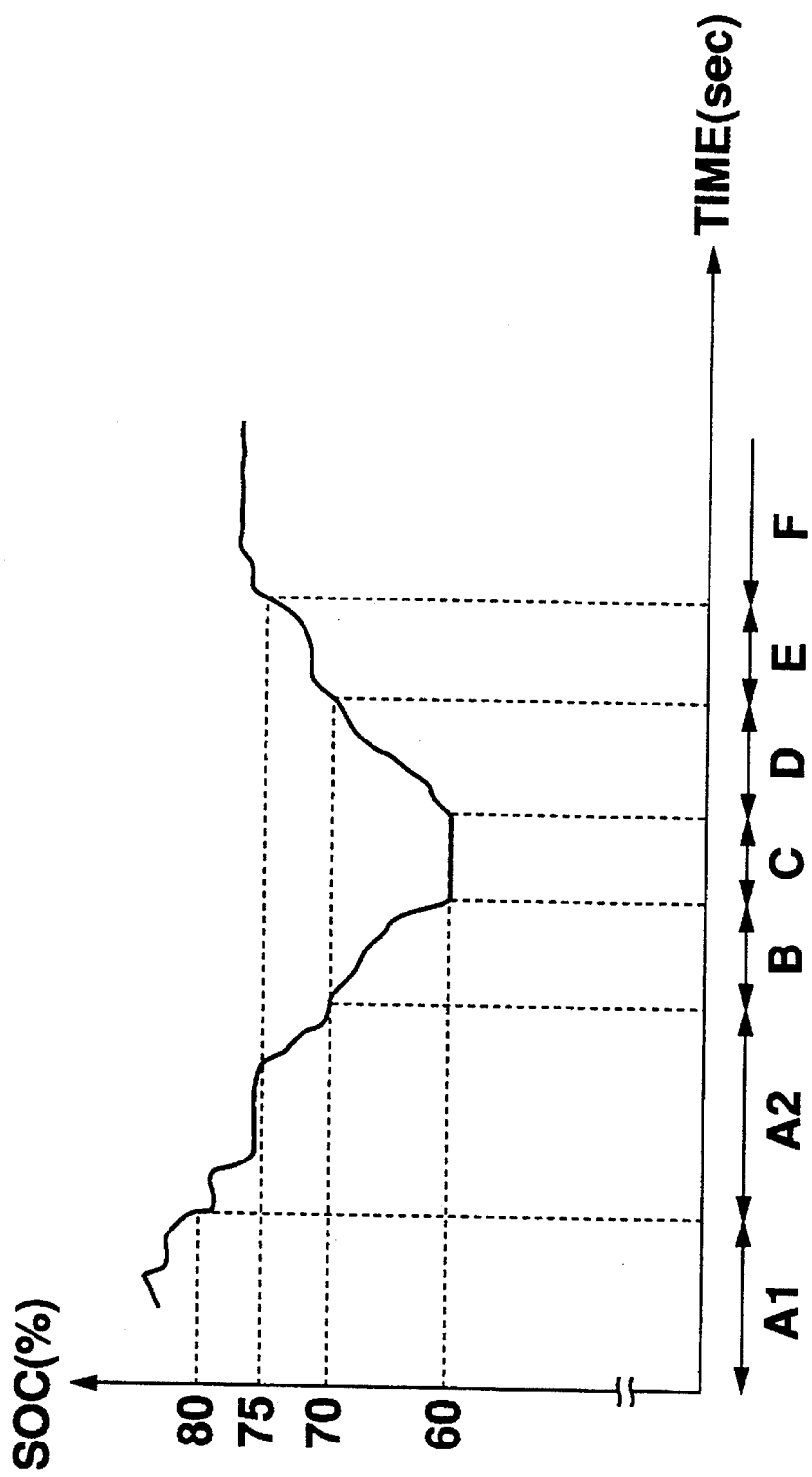
FIG. 9 is a graphical representation showing an SOC change when carrying out an SOC control in the third embodiment shown in FIG. 7.

In this embodiment, step 134 is carried out in place of step 132 in the second embodiment. In step 134, the generator output $P_G$, as the reference generator output $P_{Gref}$ is continuously controlled according to, for example, a map shown in FIG. 8. That is, when the generator output $P_G$ is controlled depending on the SOC of the battery 16, two stage control using 70% as a threshold value is not used, but a continuous control, as shown in FIG. 8. Hence, in this embodiment, for instance, while the value of the SOC of the battery 16 is reflected, the generation with an optimum output is performed and the SOC of the battery 16 can be controlled more properly. In this case, although a linear map is shown in FIG. 8, a non-linear map can, of course, be used. Further, in this embodiment, when a situation shown in FIG. 9 is considered, a controlling of the generator output $P_G$ and the motor output $P_M$ is obtained, as shown in Table 3.

TABLE 3

| Period | generator output $P_G$ (kW) | motor output $P_M$ (kW) |
|---|---|---|
| A1 | a | no limit |
| A2 | change in range of b to c depending on SOC | no limit |
| B | b | limit to value of range b to c depending on SOC |
| C | b | b |
| D | b | limit to value of range b to c depending on SOC |
| E | b | no limit |
| F | change in range of b to c depending on SOC | no limit | e) The Fourth Embodiment

Figure 10:
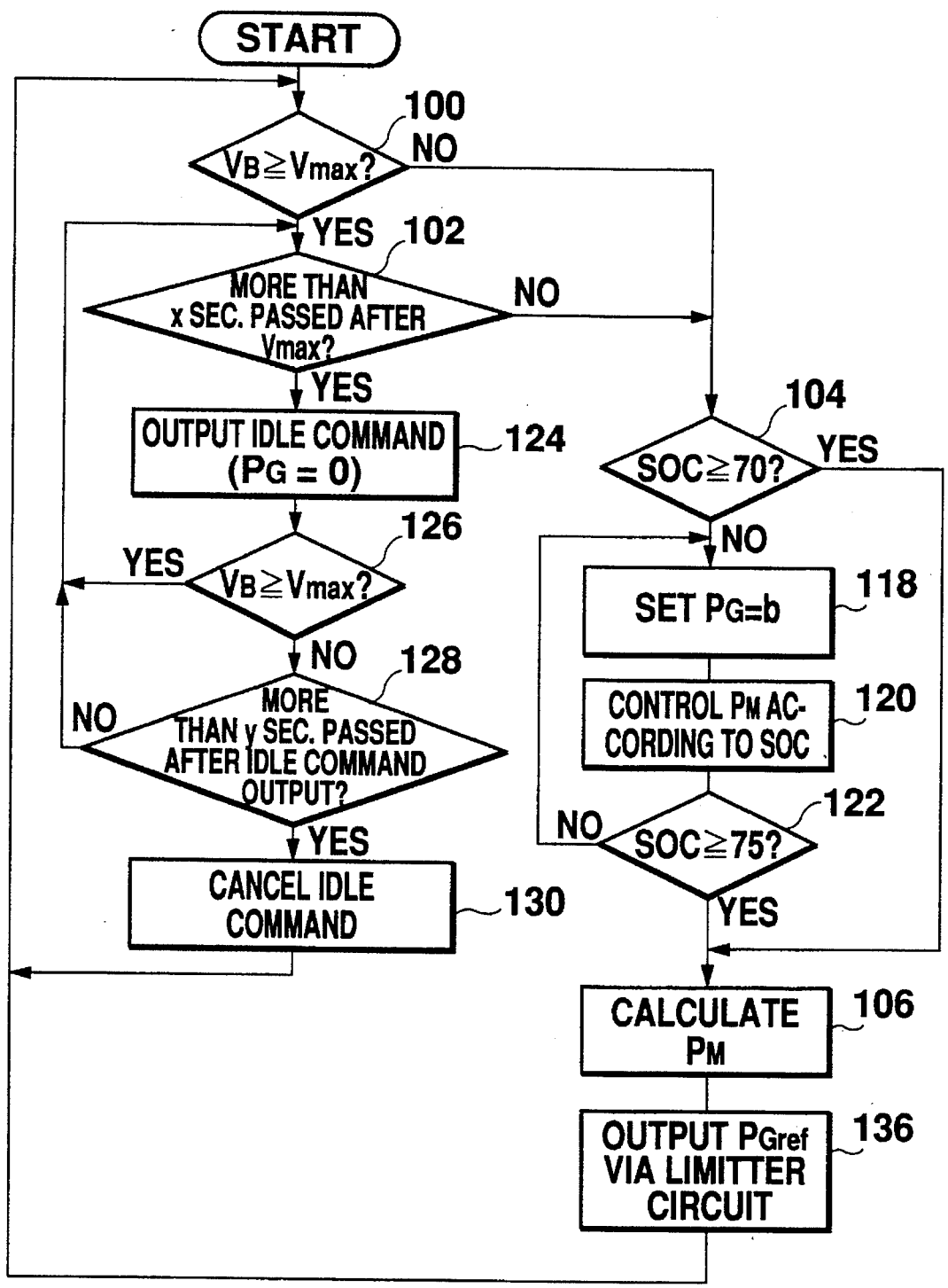
FIG. 10 is a flowchart showing an operation of a fourth embodiment of a generator controlling method according to the present invention.

In FIG. 10, there is shown a flow of an operation of the controller 26 in the fourth embodiment of a generator controlling method according to the present invention.

In this embodiment, step 136 is executed in place of steps 108 to 116 in the first embodiment. In step 136, the reference generator output $P_{Gref}$ is output via a limiter circuit shown in FIG. 11.

Figure 11:
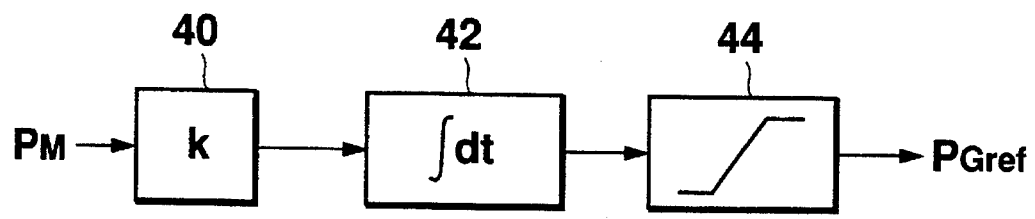
FIG. 11 is a block diagram of an output circuit for a reference generator output in the fourth embodiment shown in FIG. 10.

As shown in FIG. 11, the limiter circuit includes a multiplier 40 for multiplying the motor output $P_M$ calculated in step 106 by a predetermined value k, an integrator 42 for integrating the output of the multiplier 40 for a predetermined time (for example, 5 seconds), and a limiter 44 for limiting the output of the integrator 42 on the basis of the output range a to b of the generator 18. The output of the limiter 44 as the reference generator output $P_{Gref}$ is supplied to the engine 22 and the generator 18. Also, the predetermined value k is determined considering the efficiency of the inverter 20 and the motor 10 in the same manner as the factor k in the first embodiment. Hence, in this embodiment, the same effects as those of the first embodiment can be obtained.

f) The Fifth Embodiment

Figure 12:
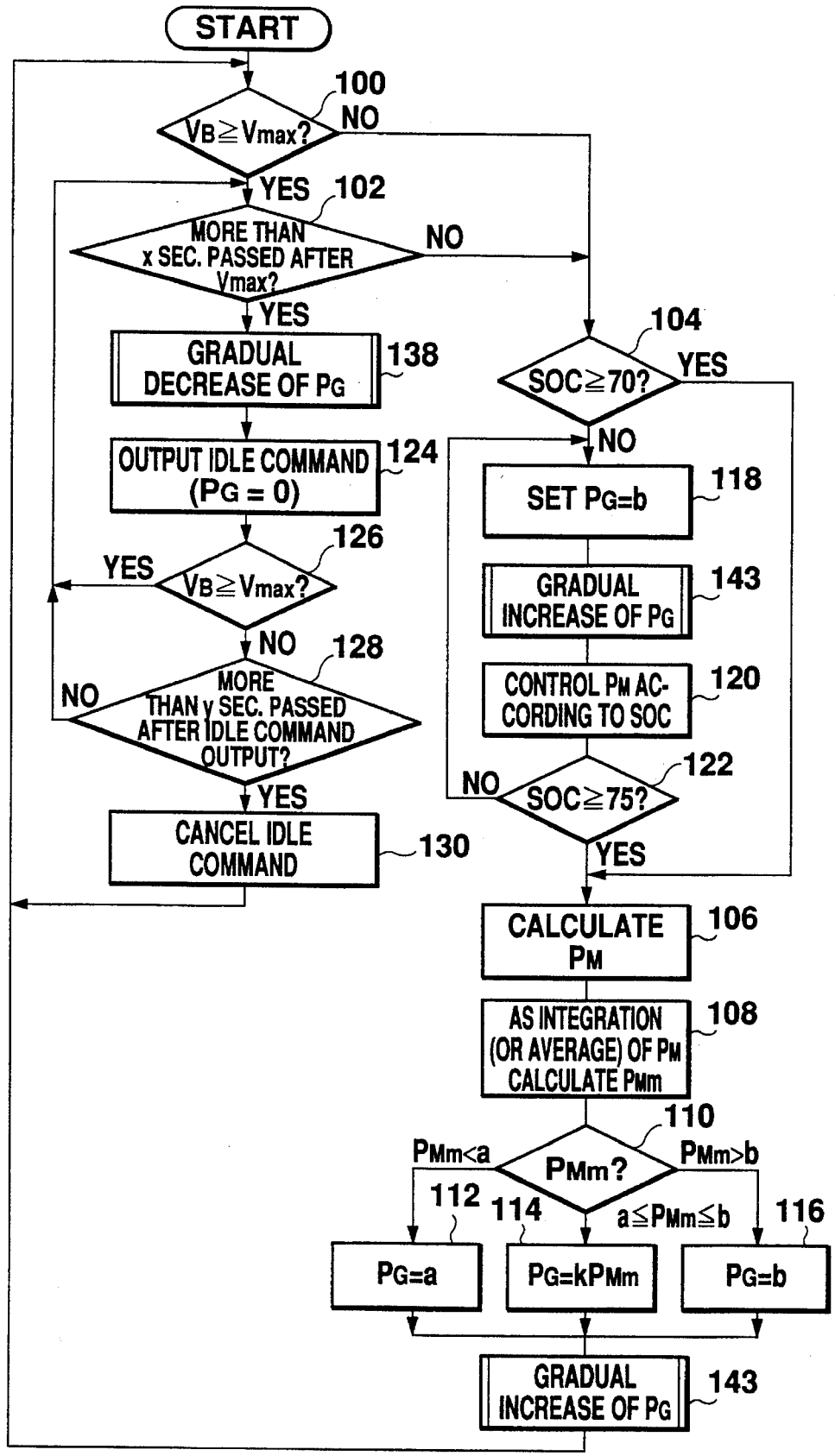
FIG. 12 is a flowchart showing an operation of a fifth embodiment of a generator controlling method according to the present invention.

In FIG. 12, there is shown a flow of an operation of the controller 26 in the fifth embodiment of a generator controlling method according to the present invention.

Figure 13:
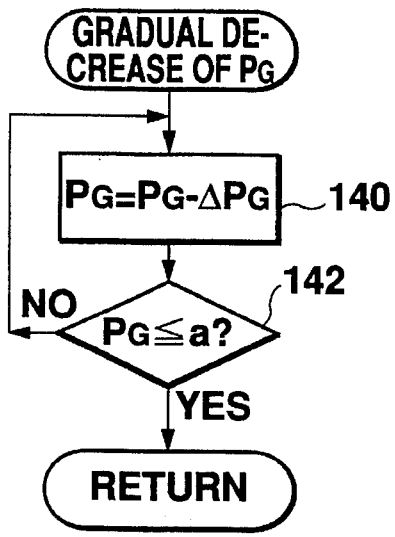
FIG. 13 is a flowchart showing a gradual decrease of generator output in the fifth embodiment shown in FIG. 12.
Figure 14:
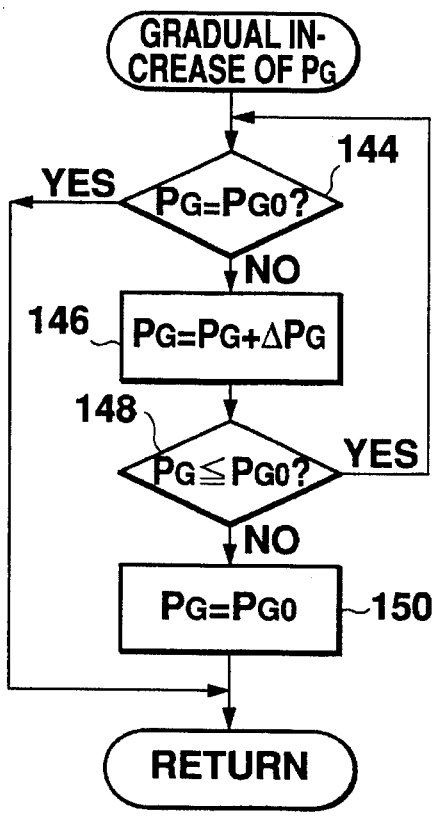
FIG. 14 is a flowchart showing a gradual increase of the generator output in the fifth embodiment shown in FIG. 12.

In this embodiment, differing from the first embodiment, step 138 is inserted between steps 102 and 124 and step 143 is inserted after step 118 and after step 112, 114 or 116. In step 138, as shown in FIG. 13, the generator output $P_G$ is controlled so as to be gradually decreased. That is, as shown in FIG. 13, in step 140, a predetermined value $\Delta P_G$ is reduced from the generator output $P_G$ and step 140 is repeatedly executed until the obtained generator output $P_G$ becomes equal to or less than the value a ($P_G \leq a$) in step 142. At the time point where $P_G \leq a$, the operation returns to step 124. On the other hand, in step 143, as shown in FIG. 14, the generator output $P_G$ is controlled to be gradually increased. That is, first, the value of the generator output $P_G$ is discriminated to see whether $P_G = P_{GO}$ or not in step 144. As a result of this discrimination, when it is discriminated that $P_G = P_{GO}$, the operation returns to step 120 or step 100, otherwise it moves to step 146. In step 146, the generator output $P_G$ is substituted with the sum of the generator output $P_G$ and the predetermined value $\Delta P_G$ and step 146 is repeatedly executed until the addition result in step 146 becomes more than predetermined value $P_{GO}$ ($P_G > P_{GO}$) in step 148. When $P_G > P_{GO}$, the generator output $P_G$ is substituted with the predetermined value $P_{GO}$ in step 150 and thereafter the operation returns to step 120 or 100.

Hence, in this embodiment, the idle control of the engine 22 and the generation stop control of the generator 18 are carried out in the same manner as the first embodiment and in these controlling steps, the gradual increase or decrease control of the generator output $P_G$ is further executed. That is, the reduction in step 140 and the discrimination in step 142 represent the gradual reduction control of the generator output $P_G$ or the reference generator output $P_{Gref}$ every predetermined value $P_{GO}$ and the idle command cannot be output until the time point where the generator output $P_G$ becomes small enough (that is, below the value a). On the other hand, after the idle command is canceled in step 130, as a result of the addition in step 146 and the discrimination in step 148, the generator output $P_G$ is reiteratively increased by predetermined value $\Delta P_G$ until the generator output $P_G$ or reference generator output $P_{Gref}$ reaches the predetermined value $P_{GO}$.

These controls prevent the fuel consumption degradation of the engine 22. That is, when the idle command is output in the state that the generator output $P_G$ is relatively large, the generator output $P_G$ changes significantly and also there is a fuel consumption degradation due to inertia with the revolution speed increase of the engine 22 on the occasion of increasing the generator output $P_G$ again after the idle command is canceled. In this embodiment, this fuel consumption degradation can be prevented.

g) Other Points

In the above-described embodiments, whether the motor 10 is being used for powering or regeneration is not mentioned but the present invention can be executed in the two states. Further, although the discharge of the battery 16 is also caused by a power supply to electrical appliances on the vehicle (not shown), it can be solved by reflecting as a compensation item in the output restriction of the motor 10 or the generation output control of the generator 18. Moreover, it is preferable to add the limitation to the regeneration amount of the motor 10.

As described above, according to the present invention, when the heavy load state is detected, the generator output is controlled to be increased and the output of the motor is restricted. Hence, the SOC of the battery can be suitably controlled so as to come within the target range and the life of the battery can be ensured. Further, when at least the heavy load state is not detected, the increase control of the generator output and the output limit of the motor are stopped or avoided and the overcharge of the battery can be prevented.

Further, according to the present invention, when the voltage increase state of the battery is detected, the idle control of the engine and the generator stop control are carried out. Hence, the overcharging can be definitely prevented. Moreover, at this time, the generator output is gradually changed and the emission degradation and the fuel consumption deterioration can be prevented.

According to the present invention, the motor output is detected and the generator output is controlled on the basis of the detected output. Thus, the SOC of the battery can properly be ensured and the fuel consumption degradation of the engine can be prevented. Furthermore, at this time, the motor output is flattened. Hence, the sharp change of the motor output is not transferred to the generator output and the emission degradation and the fuel consumption deterioration can be prevented more effectively.

Although the present invention has been described in its preferred embodiments with reference to the accompanying drawings, it it readily understood that the present invention is not restricted to the preferred embodiments and that various changes and modifications can be made by those skilled in the art without departing from the spirit and scope of the present invention.

What is claimed is:

1. A generator controller for controlling an operation of a generator mounted on a hybrid vehicle, said hydrid vehicle including a battery for supplying electric power to a motor, the generator for supplying electric power to the motor and the battery, and an engine for driving the generator, comprising:

means for detecting a heavy load state in which a battery charge state is reduced to less than a predetermined value;

means for carrying out an increase control of an output of the generator and for limiting an output of the motor so that, when the heavy load state is detected, the generator output is used, for a certain period, to charge the battery, and means for either stopping or avoiding the increase control of the generator output and the output limitation of the motor when at least heavy load state is not detected.

2. The generator controller of claim 1, further comprising:

means for detecting the battery charge reaching at least a predetermined level as voltage increased condition, which exists when the battery voltage becomes at least a predetermined voltage;

means for carrying out an idle control of the engine and a generation stop control of the generator when the voltage increased condition is detected; and means for either stopping or avoiding the idle control of the engine and the generation stop control of the generator when at least the voltage increased condition is not detected.

3. The generator controller of claim 2, further comprising:

means for gradually decreasing the output of the generator to a predetermined value when at least the idle control of the engine and the generation stop control of the generator are executed; and means for gradually increasing the output of the generator to an equivalent value required for the motor output.

4. The generator controller of claim 2, further comprising means for either stopping or avoiding the idle control of the engine and the generation stop control of the generator only when the voltage increase state continues for a predetermined time of period.

5. The generator controller of claim 2, wherein the idle control of the engine and the generation stop control of the generator are maintained for at least a predetermined time.

6. The generator controller of claim 1, further comprising:

means for detecting the output of the motor; and means for flattening the detected motor output and controlling the output of the generator on the basis of a value obtained by adding a limitation, corresponding to a generation output range of the generator, to the motor output.

7. The generator controller of claim 2, further comprising:

means for detecting the output of the motor; and means for flattening the detected motor output and controlling the output of the generator on the basis of a value obtained by adding a limitation, corresponding to a generation output range of the generator, to the motor output.

8. The generator controller of claim 3, further comprising:

means for detecting the output of the motor; and means for flattening the detected motor output and controlling the output of the generator on the basis of a value obtained by adding a limitation, corresponding to a generation output range of the generator, to the motor output.

9. The generator controller of claim 8, wherein the flattening is executed by integrating.

10. The generator controller of claim 8, further comprising means for multiplying the detected motor output by a factor considering efficiency prior to the flattening.

11. The generator controller of claim 1, further comprising means for carrying out a limitation control of the output of the generator when the charge state of the battery becomes at least a predetermined value owing to the increase control of the generator output and the output limitation of the motor.

12. The generator controller of claim 1, further comprising means for controlling the output of the generator depending on the charge state of the battery when the charge state of the battery becomes at least a predetermined value owing to the increase control of the generator output and the output limitation of the motor.

13. A generator controlling method for controlling an operation of a generator, executed on a hybrid vehicle including a battery for supplying electric power to a motor, the generator for supplying electric power to the motor and the battery, and an engine for driving the generator, comprising:

a step for detecting a heavy load state in which a battery charge state is reduced to less than a predetermined value;

a step for carrying out an increase control of an output of the generator and for limiting an output of the motor so that, when the heavy load state is detected, the generator output is used, for a certain period, for charging the battery; and a step for either stopping or avoiding the increase control of the generator output and the output limitation of the motor when at least the heavy load state is not detected.

14. The generator controlling method of claim 13, further comprising:

a step for detecting the battery charge reaching at least a predetermined level as voltage increased condition, which exists when the battery voltage becomes at least a predetermined voltage;

a step for carrying out an idle control of the engine and a generation stop control of the generator when the voltage increased condition is detected; and a step for either stopping or avoiding the idle control of the engine and the generation stop control of the generator when at least the voltage increased condition is not detected.

15. The generator controlling method of claim 14, further comprising:

a step for gradually decreasing the output of the generator to a predetermined value when the idle control of the engine and the generation stop control of the generator are executed; and a step for gradually increasing the output of the generator to an equivalent value required for the motor output.

16. The generator controlling method of claim 13, further comprising:

a step for detecting the output of the motor; and a step for flattening the detected motor output and controlling the output of the generator on the basis of a value obtained by adding a limitation corresponding to a generation output range of the generator to the motor output.

* * * * *